Patented Sept. 13, 1938

2,130,034

UNITED STATES PATENT OFFICE 2,130,034

TOOTH CLEANSING AGENT

Hans Schmidt, Wuppertal-Vohwinkel, Germany, assignor to Winthrop Chemical Company, Inc., New York, N. Y., a corporation of New York No Drawing. Application May 26, 1937, Serial No. 144,832. In Germany May 30, 1936

7 Claims. (Cl. 167—93)

The present invention relates to tooth cleansing agents.

Tooth pastes and tooth powders generally contain as mechanical cleansing agents respectively filling materials powdered mineral substances or salts such as prepared chalk, calcium phosphate, calcium sulfate, silicic acid and others. These substances show the disadvantage that they affect the enamel of the tooth partly because of their hardness partly because they contain even in a very finely powdered state pieces of crystals.

In accordance with the present invention it has been established that solid artificial resins in the form of powder are very suitable as mechanical cleansing agents in tooth pastes and powders. Because of their hardness and their complete lack of crystal edges and rims they can be considered as sparing and yet effective mechanical cleansing agents in tooth pastes and tooth powders.

As suitable artificial resins there are particularly to be mentioned the condensation products of aldehydes and amines, for instance those obtained from formaldehyde and acetaldehyde on the one hand and for instance urea, thiourea, cyanamide, dicyanamide, guanidine and aromatic amines, such as aniline and toluidine. Also products obtained by hardening casein for instance with formaldehyde may be used. There come further into consideration products of aldehydes particularly the aforementioned ones with phenols such as hydroxy-benzene, cresol or naphthol. Also condensation products of aldehydes or ketones among themselves, which condensation is effected under the influence of alkaline reacting agents, for instance the polymerization products of cyclohexanone may be used. Condensation products of aldehydes with naphthalene in the presence of sulfuric acid or of polyvalent alcohols and carboxylic acids, particularly those containing more than one carboxylic acid group have proved to be suitable. In this connection condensation products of, for instance, glycerin or glycols, for example 1-3-butylene glycol or mannitol on the one hand and phthalic acid, maleic acid, abietic acid and tartaric acid on the other hand may be mentioned. There come further into consideration polyvinyl compounds for instance mixed polymerisates of vinyl chloride on the one hand and vinyl esters, particularly vinyl acetate respectively acrylic acid esters, such for instance as acrylic acid methyl or ethyl ester on the other hand or polystyrene products. Also polyvinyl naphthalene, polyvinyl carbazol and polyvinyl chloride which may be afterchlorinated as well as condensation products of maleic acid esters with vinyl acetate and styrene may be used.

It is also possible to employ products obtained by chlorination of either natural or synthetic rubber or the intermediate products obtained in the condensation of formaldehyde and phenol, which are known under the names of resits and resitols, after hardening for instance by heat treatment.

The time and conditions of resinification may vary within wide limits.

As especially adapted have proved artificial resins which are obtained by condensation of formaldehyde and amines, particularly ureas, such as $CO(NH_2)_2$, or cyanamide.

The artificial resins can be employed in the form of pressed powders, or the ready-made products respectively the wastes are ground to powders. The products are preferably added in a very finely ground and sieved state to the tooth pastes respectively tooth powders which contain the other ingredients required for cosmetic or hygienic reasons. As such additional ingredients there may be mentioned by way of example disinfecting agents such as mixtures of high molecular alkyl-dimethyl benzyl ammonium chlorides, as well as flavor and taste corrigents for instance peppermint oil. Also gum arabic, karaya gum and tragacanth may be present in the tooth cleansing agents according to the invention.

The artificial resins may be added in various proportions according to the requirements which the tooth cleansing agents shall satisfy. Thus for instance a tooth paste containing about 40 to about 50% of the artificial resin, preferably of the type obtained by the condensation of urea and formaldehyde, which resin is known under the trade-name of "Pollopas" has proved to be suitable.

Tooth pastes according to the present invention may for instance be prepared according to the following formulae which are merely illustrative and which in no way limit my present invention:

|   | Grams |
|---|---|
| 1. Powdered urea-formaldehyde condensation product (so called "Pollopas" waste pressed material) | 47 |
| Glycerin | 53 |
| 2. Pressed powder of an urea-formaldehyde-condensation product (so called "Pollopas" pressed mixture) | 43 |
| Glycerin | 57 |
| 3. Urea - formaldehyde - condensation product | 32 |
| Aluminum silicate | 20 |
| Glycerin | 48 |
| 4. Mixed polymerizate of vinyl chloride and acrylic acid methyl ester | 45 |
| Glycerin | 55 |
| 5. Emulsion polymerizate of stryene | 18 |
| Glycerin | 82 |
| 6. Polyvinyl chloride | 35 |
| Glycerin | 65 |

| | Grams |
|---|---|
| 7. Condensation product of formaldehyde and cyanamide | 43 |
| Triglycolamic acid sodium as tartar-dissolving addition | 4 |
| Glycerin | 52 |
| Ethereal oil | 1 |
| 8. "Pollopas"-pressed mixture according to Formula No. 2 | 35 |
| Triglycolamic acid sodium as tartar-dissolving addition | 4 |
| Talc | 3 |
| Glycerin | 57 |
| Ethereal oil | 1 |

The aforenamed admixtures may be added to these tooth pastes.

I claim:

1. Tooth cleansing agent comprising as mechanical cleansing agent a solid artificial resin in the form of powder.

2. Tooth cleansing agent comprising as mechanical cleansing agent a solid artificial resin obtained by condensation of an aldehyde with an amine in the form of powder.

3. Tooth cleansing agent comprising as mechanical cleansing agent a solid artificial resin obtained by condensation of formaldehyde and an amine in the form of powder.

4. Tooth cleansing agent comprising as mechanical cleansing agent a solid artificial resin obtained by condensation of formaldehyde and an urea in the form of powder.

5. Tooth cleansing agent comprising as mechanical cleansing agent a solid artificial resin obtained by condensation of formaldehyde and $CO(NH_2)_2$ in the form of powder.

6. Tooth cleansing agent comprising as mechanical cleansing agent a solid artificial resin obtained by condensation of formaldehyde and cyanamide.

7. Tooth cleansing agent comprising as mechanical cleansing agent from about 40 to about 50% of a solid artificial resin obtained by condensation of an aldehyde with an amine in the form of powder.

HANS SCHMIDT.